United States Patent

Schmidt et al.

Patent Number: 6,146,455
Date of Patent: Nov. 14, 2000

[54] CRYSTAL MODIFICATION OF C.I. PIGMENT RED 53:2 (δ-PHASE)

[75] Inventors: Martin Ulrich Schmidt, Frankfurt am Main; Hans Joachim Metz, Darmstadt, both of Germany

[73] Assignee: Clariant GmbH, Frankfurt, Germany

[21] Appl. No.: 09/337,431

[22] Filed: Jun. 21, 1999

[30] Foreign Application Priority Data

Jun. 19, 1998 [DE] Germany .................. 198 27 273

[51] Int. Cl.[7] .................. C09B 67/10; C09B 67/20; C09B 67/48
[52] U.S. Cl. .................. 106/493; 106/496; 534/575
[58] Field of Search .................. 106/493, 496; 534/575

[56] References Cited

U.S. PATENT DOCUMENTS

| | | | |
|---|---|---|---|
| 4,719,292 | 1/1988 | Schui et al. | 534/575 |
| 5,266,110 | 11/1993 | Rieper et al. | 106/496 |

FOREIGN PATENT DOCUMENTS

| | | |
|---|---|---|
| 0097913 | 1/1984 | European Pat. Off. . |
| 0545072 | 6/1993 | European Pat. Off. . |

OTHER PUBLICATIONS

European Search Report.
Patent Abstracts of Japan & JP 10231438 Sep. 02, 1998 (Dainippon Ink & Chem Inc.).

*Primary Examiner*—Mark L. Bell
*Assistant Examiner*—Michael J. DiVerdi
*Attorney, Agent, or Firm*—Susan S. Jackson; Scott E. Hanf

[57] ABSTRACT

The invention relates to a novel crystal modification (δ-modification) of C.I. Pigment Red 53:2 of the formula (1)

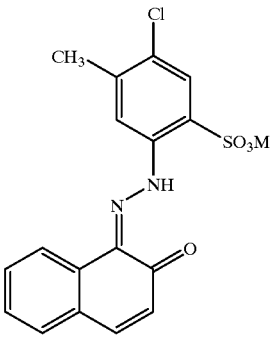

(I)

having the following characteristic reflections in the X-ray powder diffraction pattern:

| 2Θ | d | relative intensity (in %) |
|---|---|---|
| 3.3 | 26.6 | 32 |
| 4.7 | 18.7 | 100 |
| 7.5 | 11.9 | 14 |
| 9.4 | 9.3 | 19 |
| 10.5 | 8.4 | 13 |
| 13.8 | 6.4 | 10 |
| 14.2 | 6.2 | 9 |
| 14.9 | 5.9 | 10 |
| 16.7 | 5.3 | 11 |
| 17.6 | 5.0 | 9 |
| 18.1 | 4.9 | 16 |
| 18.9 | 4.7 | 10 |
| 20.4 | 4.3 | 7 |
| 21.1 | 4.2 | 9 |
| 22.1 | 4.0 | 9 |
| 22.7 | 3.9 | 12 |
| 23.1 | 3.8 | 9 |
| 23.6 | 3.8 | 13 |
| 24.1 | 3.7 | 9 |
| 24.9 | 3.6 | 10 |
| 25.5 | 3.5 | 23 |
| 26.3 | 3.4 | 9 |
| 27.7 | 3.2 | 9 |
| 28.1 | 3.2 | 6 |
| 28.9 | 3.1 | 6 |
| 30.4 | 2.9 | 6 |

17 Claims, 2 Drawing Sheets

δ - PHASE

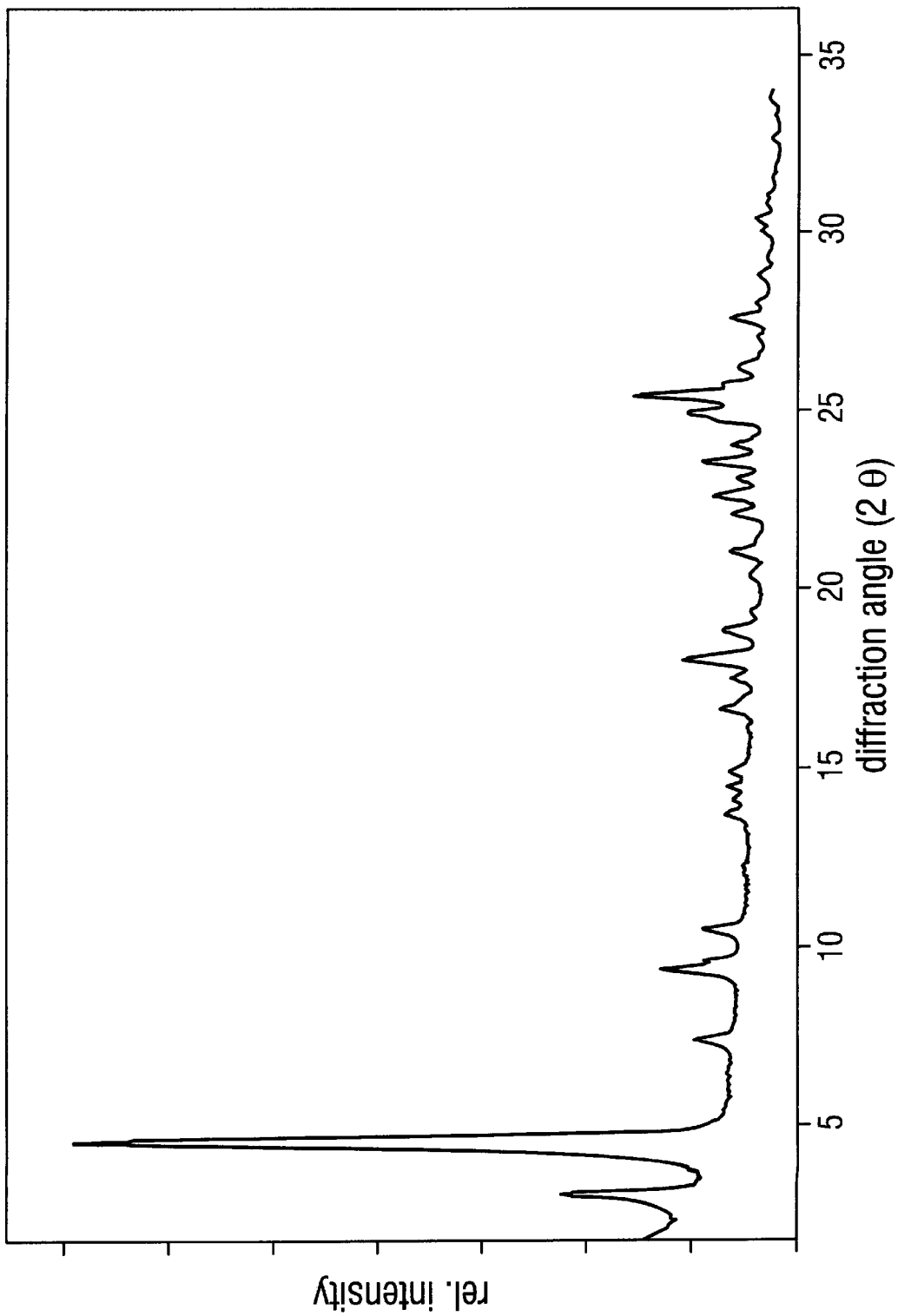

CRYSTAL MODIFICATION OF C.I. PIGMENT RED 53:2 (δ-PHASE)

CROSS-REFERENCES TO RELATED APPLICATIONS

The present invention is described in the German priority application No. 198 27 272.1 filed on Jun. 19, 1998, which is hereby incorporated by reference as is fully disclosed herein.

BACKGROUND OF THE INVENTION

C.I. Pigment Red 53:2 (below: P.R.53:2) is defined as the compound of the formula (I) which forms from the coupling of diazotized 2-amino-5-chloro-4-methylbenzenesulfonic acid with β-naphthol and subsequent reaction of the resulting sulfo acid with a calcium salt (M=½Ca$^{2+}$).

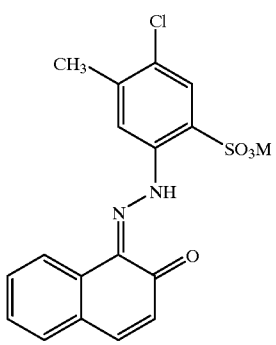

(I)

In the solid state, the compound of the formula (I) may also be present in another tautomeric or isomeric form and may also contain Na$^+$ ions, Cl ions and/or water molecules.

Pigment Red 53 has long been known as a sodium salt (M=Na$^+$). The barium salt, P.R.53:1, (M=Ba$^{2+}$/2), has long been produced in large amounts as a red pigment. It is used mainly in printing inks. The strontium salt (P.R.53:3) is of little commercial importance, as is the only modification of the calcium salt known to date (Pigment Red 53:2).

Most organic pigments exist in a plurality of different crystal modifications, also referred to as "polymorphic forms". Crystal modifications have the same chemical composition but a different arrangement of the molecules in the crystal. The crystal structure may influence the chemical and physical properties, and the individual crystal modifications therefore often differ in the rheology, the color and other coloristic properties. The crystal modifications can be identified by X-ray powder diffractometry.

From P.R. 53:2 (M=Ca$^{2+}$/2), a crystal modification has been known to date which is referred to below as the α-modification. It is distinguished by the following characteristic lines in the X-ray powder pattern (Cu—K$_\alpha$ radiation, double diffraction angle, 2θ values in degrees, interplanar spacings d in Å$^{-1}$, cf. FIG. 1):

| α: | 2Θ | d | Relative intensity in % |
|---|---|---|---|
| | 5.1 | 17.4 | 100 |
| | 6.6 | 13.4 | 73 |
| | 10.2 | 8.7 | 37 |
| | 12.2 | 7.2 | 39 |
| | 13.8 | 6.4 | 31, broad |
| | 14.4 | 6.2 | 27, broad |
| | 17.8 | 5.0 | 24, broad |
| | 18.4 | 4.8 | 22 |
| | 20.4 | 4.4 | 20 |
| | 24.6 | 3.6 | 26 |
| | 25.8 | 3.4 | 86 |

All line positions are associated with an uncertainty of ±0.2°. Depending on the crystal size and crystal quality, the lines at 13.8° and 14.4° may be fused into a broad line, as may be the lines at 17.8° and 18.4°.

SUMMARY OF THE INVENTION

The invention relates to a novel crystallographic modification (δ-modification) of C.I. Pigment Red 53:2. The invention also relates to a process for the preparation of the δ-modification of C.I. Pigment Red 53:2.

DESCRIPTION OF THE DRAWINGS

FIG. 2. The crystal modification of C.I. Pigment Red 53:2 (δ-phase).

DESCRIPTION OF THE PREFERRED EMBODIMENTS

Figure 1:
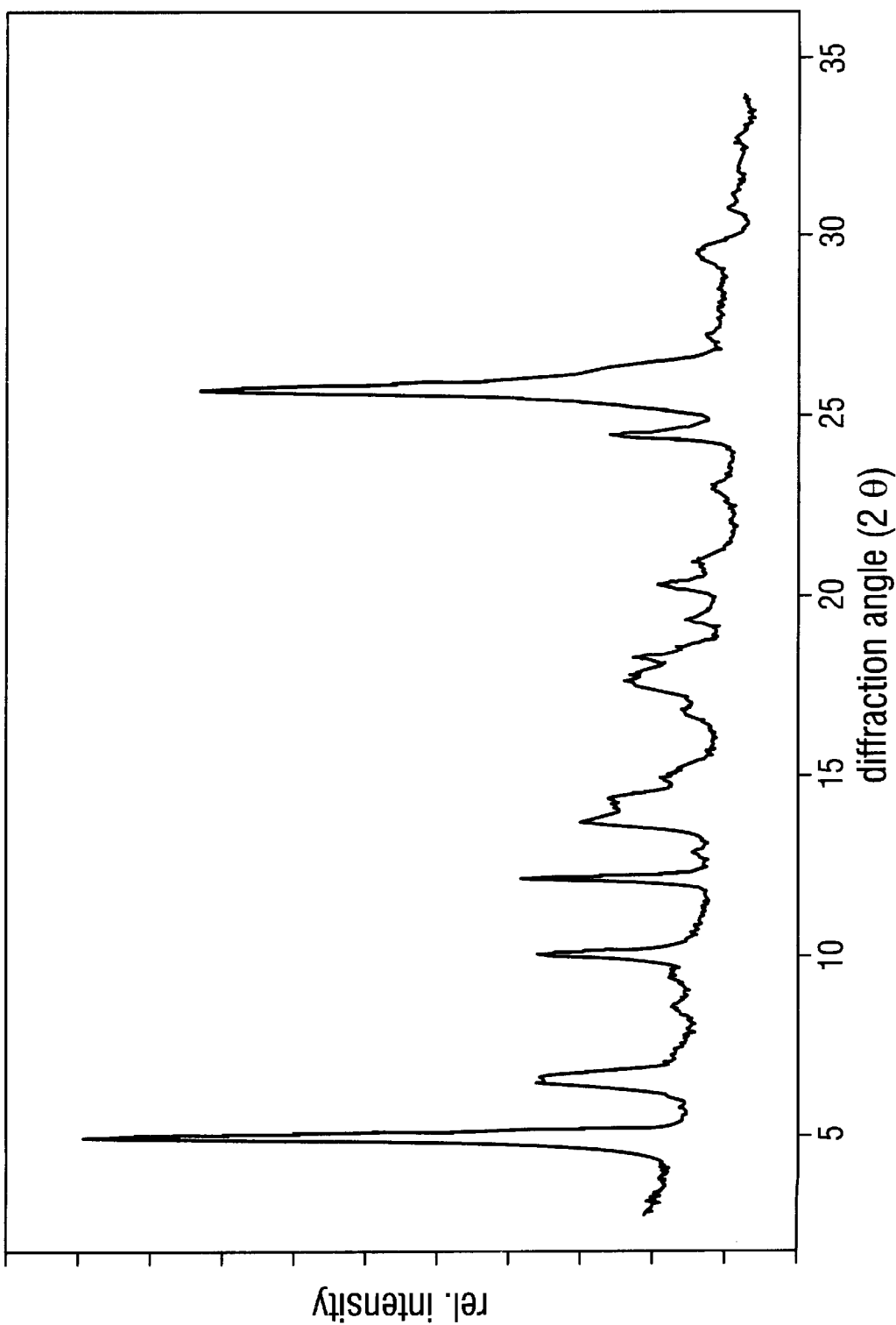
FIG. 1. The crystal modification of C.I. Pigment Red 53:2 (α-phase).

A novel crystal modification of P.R. 53:2, which is referred to as the δ-modification, has now surprisingly been found. It is distinguished by the following characteristic lines (Cu—K$_\alpha$ radiation, 2θ values in degrees, d values in Å$^{-1}$, cf. FIG. 2):

| δ: | 2Θ | d | Relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6 |

Here too, all line positions are associated with an uncertainty of ±0.2°.

The relative intensities are usually influenced by preferred orientation and texture effects.

It is possible that some (up to 50%) of the Ca ions in the crystal lattice of the crystal modification according to the invention are replaced by other cations, e.g. $Na^+$, $H^+$, $K^+$, $NH_4^+$, $Mg^{2+}$, $Sr^{2+}$, $Ba^{2+}$, $Sn^{2+}$, $Zn^{2+}$, $Mn^{2+}$, $Fe^{2+}$, $Fe^{3+}$, $Al^{3+}$, $Si^{4+}$, $Ti^{4+}$ or $TiO^{2+}$. Such crystalline solid solutions can form if said other cations are also present during the measures described below for the preparation of the modification according to the invention. Moreover, anions, such as, for example, $Cl^-$, and/or water molecules may be included in the crystal lattice. However, it is preferable if 80% to almost 100% of M are Ca/2.

The invention therefore relates to C.I. Pigment Red 53:2 of the above formula (I), in which M is a cation, with the proviso that at least 50% of the cations are calcium ions, in the δ-modification, which has the abovementioned characteristic reflections in the X-ray powder diffraction pattern.

The δ-modification is slightly soluble, has high color strength and is distinguished by brilliant, orange colorations.

The invention also relates to a process for the preparation of the δ-modification of C.I. Pigment Red 53:2 by reacting β-naphthol with the diazonium salt of the formula (2)

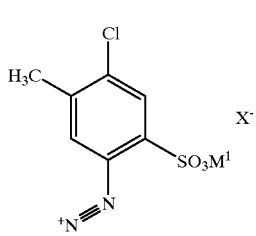

(2)

in which $M^1$ is hydrogen or a cation equivalent, such as, for example, Na, K, ½ Mg, ⅓ Al, ½ Zn or $NH_4$;

and X is an anion or anion equivalent, such as, for example, $Cl^-$, ½ $SO_4^{2-}$, $HSO_4^-$, $NO_3^-$ or $CH_3COO^-$;

and a calcium salt, for example $CaCl_2$, $Ca(NO_3)_2$, Ca acetate, $Ca(HCO_3)_2$, $CaCO_3$, CaO or $Ca(OH)_2$, in the presence of chlorobenzene.

The reaction can usually be carried out at temperatures of from 0° C. to 200° C., preferably from 20° C. to the boiling point of said solvent, at atmospheric pressure.

The crystal modification according to the invention is also obtained if C.I. Pigment Red 53:2 which is present wholly or partly in the α-modification is heated together with chlorobenzene or a chlorobenzene/water mixture to a temperature of from 40 to 200° C., preferably from 60° C. to the boiling point of the solvent or solvent mixture, at atmospheric pressure, the pigment partly or wholly going into solution, and is then reprecipitated, for example by reducing the temperature to from −20 to ±90° C. and/or by adding water and/or a second solvent having a lower dissolving power and/by changing the pH and/or by adding a salt, such as, for example, NaCl.

The chlorobenzene/water mixture used for dissolution or partial dissolution at elevated temperature may contain up to 95% by weight of water. Heating may be carried out at atmospheric pressure, at reduced pressure or at superatmospheric pressure.

For example, benzene, toluene or alkanes are suitable as a second solvent. The change in the pH can be brought about by adding acids or bases. The P.R. 53:2 used as starting material may be employed as a dry pigment, in the form of a water-moist press cake, as a solution or as an aqueous suspension. The duration of the solvent treatment described may be from 10 seconds to 24 hours, preferably from 10 minutes to 2 hours. In order to obtain the crystal modification according to the invention, it is expedient subsequently to reduce the temperature to a value in the range between 20 and 80° C., preferably in the course of from 5 minutes to 2 hours.

The P.R. 53:2 according to the invention and of the δ-modification can be isolated at elevated temperature or after cooling, for example to room temperature, in the conventional manner, for example by filtering off or by evaporating the solvent, if necessary with application of a vacuum. It may be expedient to wash the press cake or residue with water, an organic liquid, for example a lower alcohol, such as methanol, ethanol, propanol or isopropanol, or with acetone.

Depending on the desired field of use, it may be useful to subject the pigment obtained to fine mechanical comminution. The fine comminution can be effected by wet or dry milling. The milling may be followed by a treatment with a solvent, with water or with a solvent/water mixture in order to convert the pigment into a ready-to-use form.

The crystal modification according to the invention is also obtained if C.I. Pigment Red 53:2 which is present wholly or partly in the α-modification is kneaded or milled in the presence of chlorobenzene or a chlorobenzene/water mixture. The kneading or milling can be carried out at a temperature of from 40 to 200° C., preferably from 60° C. to the boiling point of the solvent chosen, at atmospheric pressure.

Depending on the composition of the chlorobenzene-containing mixture, on the concentration, on the temperature used, on the pressure, on the cooling rate of the solution and on the presence of seed crystals, the pure δ-phase or a mixture of α- and δ-phase may form.

The pure or predominantly pure δ-modification is preferably formed if a solution in which seed crystals or crystal nuclei of the δ-modification are already present is used as the starting material and if this solution is cooled so slowly, or a second, more poorly dissolving solvent, an acid, a base or a salt is added so slowly, that supersaturation is kept in a range in which the crystal growth rate is relatively high but the rate of formation of crystal nuclei is relatively low, so that the crystal nuclei present grow while the modification is maintained. The use of a mechanical stirrer may be advantageous since it breaks up existing crystals of the δ-modification into many smaller fragments which then in turn serve as crystal nuclei for the δ-modification (so-called secondary nucleation). If the supersaturation is higher, for example because the solution is cooled more rapidly or a second solvent, an acid, a base or a salt is added more rapidly, the rate of formation of crystal nuclei is higher so that many crystal nuclei of the α- and δ-modification may form spontaneously; this generally gives mixtures of modifications which only partly comprise the δ-modification.

The preparation of a mixture of the α- and δ-modification may be of interest if specific coloristic and rheological properties are desired, for example a specific orange hue outside or between the orange-red α-modification and the orange δ-modification. On the other hand, it is also possible to concentrate a mixture of δ-modification and α-modification in order to obtain a higher δ-fraction or the pure δ-modification, for example by a air classification, recrystallization, selective dissolution or extraction of the α-modification or by repeated use of process measures according to the invention, in which the formation of the δ-modification is favored.

The present invention therefore also relates to a C.I. Pigment Red 53:2 mixture which contains at least 10%, preferably at least 25%, in particular at least 50%, particularly preferably at least 75%, of the δ-modification.

To facilitate the change of modification, to stabilize the δ-modification, to improve the coloristic properties and/or to achieve specific coloristic effects, pigment dispersants, surfactants, antifoams, extenders or other additives may be added at any desired points in the process. Mixtures of these additives may also be used. The additives may be added all at once or in a plurality of portions. The additives may be added at any point during the synthesis or during the various treatments (heating with a solvent or in water, recrystallization, milling, kneading) or after the aftertreatments. The most suitable time must be determined beforehand by exploratory experiments.

The C.I. Pigment Red 53:2 according to the invention, in the δ-modification, or mixtures which contain the δ-modification, or the described crystalline solid solutions of the δ-modification with other cations are suitable for pigmenting coatings and plastics, for the production of printing inks and aqueous pigment preparations and for coloring seeds.

The δ-modification according to the invention, said mixtures and said crystalline solid solutions are also suitable as colorants in electrophotographic toners and developers, such as, for example, one- or two-component powder toners (also referred to as one- or two-component developers), magnetic toners, liquid toners, polymerization toners and special toners.

Typical toner binders are polymer resins, polyaddition resins and polycondensation resins, such as styrene, styrenelacrylate, styrene/butadiene, acrylate, polyester or phenol/epoxide resins, polysulfones or polyurethanes, individually or in combination, and polyethylene and polypropylene, which may contain further ingredients, such as charge controlling agents, waxes or flow assistants, or are subsequently modified with these additives.

Furthermore, the δ-modification according to the invention or one of said mixtures or crystalline solid solutions is suitable as a colorant in powders and powder coatings, in particular triboelectrically or electrokinetically sprayable powder coatings, which are used for the surface coating of articles of, for example, metal, wood, plastic, glass, ceramic, concrete, textile material, paper or rubber.

Typically used powder coating resins are epoxy resins, polyester resins containing carboxyl and hydroxyl groups, and polyurethane and acrylate resins, together with conventional curing agents. Combinations of resins are also used. Thus, for example, epoxy resins are frequently used in combination with polyester resins containing carboxyl and hydroxyl groups. Typical curing components (depending on the resin system) are, for example, acid anhydrides, imidazoles and dicyandiamide and their derivatives, blocked isocyanates, bisacylurethanes, phenol resins and melamine resins, triglycidyl isocyanurates, oxazolines and dicarboxylic acids.

Moreover, the δ-modification according to the invention or one of said mixtures and crystalline solid solution are suitable as colorants in aqueous and nonaqueous inkjet inks and in those inks which operate according to the hot melt method. Furthermore, the δ-modification according to the invention or one of said mixtures and crystalline solid solutions are suitable as colorants for color filters and for additive as well as subtractive color production.

In the following examples, parts and percentages are based on weight. The crystal modification of the products obtained is carried out by X-ray powder diffractometry (Cu—K$_\square$ radiation).

EXAMPLES

1) Addition of Chlorobenzene During the Laking a) Diazotization and coupling:

226 parts of 2-amino-4-methyl-5-chlorobenzenesulfonic acid are stirred with 2500 parts of water and 150 parts of 31% strength hydrochloric acid at room temperature. At 20–25° C., diazotization is effected with 173 parts of 40% strength NaNO$_2$ solution in the course of 30 minutes and stirring is continued for 1 hour at room temperature. 150 parts of β-naphthol are dissolved in 1100 parts of 4% strength NaOH and added to the diazo suspension at room temperature in the course of 60 minutes.

b) Laking in the presence of chlorobenzene:

The pH of the suspension is adjusted to 8.0 with NaOH, and 480 parts of chlorobenzene and 76 parts of CaCl$_2$ are added. The chlorobenzene is distilled off by passing in steam (at atmospheric pressure). The mixture is filtered while hot. The press cake is washed with cold water and dried at 60° C. 400 parts of P.R. 53:2 in the δ-modification are obtained.

2) Addition of Chlorobenzene After the Laking

The diazotization and coupling are carried out as in Example 1. The pH of the suspension from Example 1a) is adjusted to 8.0 with NaOH, and 61 parts of CaCl$_2$ and 500 parts of water are added. The mixture is stirred for 15 minutes at 95° C. 2400 parts of chlorobenzene are added to the suspension at 80° C. and the mixture is refluxed for 2 hours (88–90° C). The chlorobenzene is distilled off with steam; the mixture is filtered and the residue is washed with water and dried at 60° C. 408 parts of P.R. 53:2 in the δ-modification are obtained.

3) Treatment of the Press Cake with Chlorobenzene

The diazotization and coupling are carried out as in Example 1. The pH of the suspension from Example 1a) is adjusted to 8.0 with NaOH, and 61 parts of CaCl$_2$ and 500 parts of water are added. The suspension is stirred for 15 minutes at 95° C. and filtered while hot and the press cake is washed salt-free. 1534 parts of press cake are obtained. 128 parts of this press cake are stirred with 332 parts of water and 200 parts of chlorobenzene and refluxed for 2 hours (88–90° C.). The chlorobenzene is distilled off with steam, the mixture is filtered and the residue is washed with water and dried at 60° C. 30 parts of P.R. 53:2 in the δ-modification are obtained (cf. FIG. 2).

What is claimed is:

1. A C.I. Pigment Red 53:2 of the formula (I)

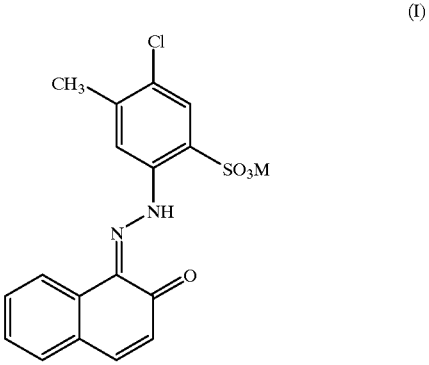

(I)

in which M is a cation, with the proviso that at least 50% of the cations are calcium ions, in the δ-modification, which has the following characteristic reflections in the X-ray powder diffraction pattern, measured using Cu—K$_\alpha$ radiation:

| δ: | 2Θ | d | relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6. |

2. The C.I. Pigment Red 53:2 as claimed in claim 1, wherein from 80% to almost 100% of M are calcium.

3. The C.I. Pigment Red 53:2 as claimed in claim 1, wherein M is one or more cations $Na^+, H^+, K^+, NH_4^+, Mg^{2+}, Sr^{2+}, Ba^{2+}, Sn^{2+}, Zn^{2+}, Mn^{2+}, Fe^{2+}, Fe^{3+}, Al^{3+}, Si^{4+}, Ti^{4+}$ or $TiO^{2+}$, in addition to calcium.

4. A process for the preparation of C.I. Pigment Red 53:2 of the formula (I)

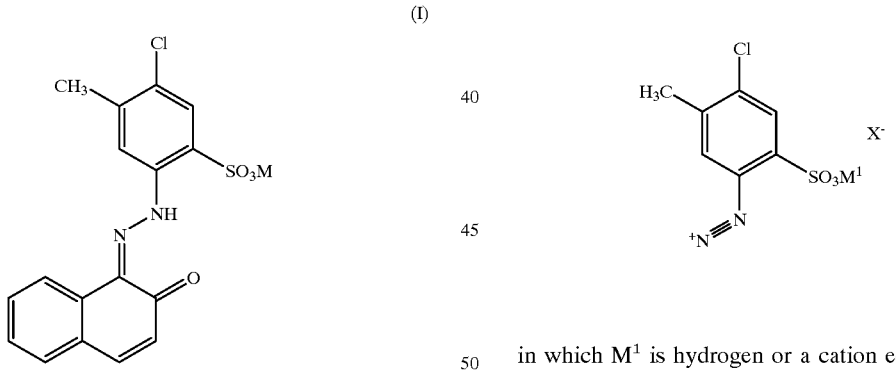

in which M is a cation, with the proviso that at least 50% of the cations are calcium ions, in the δ-modification, which has the following characteristic reflections in the X-ray powder diffraction pattern, measured using Cu—$K_\alpha$ radiation:

| δ: | 2Θ | d | Relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6 | wherein β-naphthol is reacted with the diazonium salt of the formula (2)

in which $M^1$ is hydrogen or a cation equivalent and

X is an anion and with a calcium salt in the presence of chlorobenzene.

5. The process as claimed in claim 4, wherein X is chloride, sulfate, hydrogen sulfate, nitrate or acetate.

6. The process as claimed in claim 4, wherein the calcium salt is $CaCl_2$, $Ca(NO_3)_2$, $CaCO_3$, $Ca(HCO_3)_2$, Ca acetate, CaO or $Ca(OH)_2$.

7. The process as claimed in claim 4, wherein the reaction is carried out at a temperature of from 0 to 200° C.

8. The process as claimed in claim 4, wherein the reaction is carried ot at a temperature of from 20° C. to the boiling point of the chlorobenzene at atmospheric pressure.

9. A process for the preparation of C.I. Pigment Red 53:2 of the formula (I)

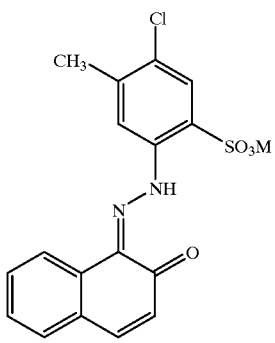

(I)

in which M is a cation, with the proviso that at least 50% of the cations are calcium ions, in the δ-modification, which has the following characteristic reflections in the X-ray powder diffraction pattern, measured using Cu—$K_\alpha$ radiation:

| δ: | 2Θ | d | Relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6 | wherein C.I. Pigment Red 53:2 which is present wholly or partially in the α-modification is heated, together with chlorobenzene or a chlorobenzene/water mixture, to a temperature of from 40 to 200° C., and then cooled to a temperature of from −20 to +90° C., optionally water, a second solvent having low dissolving power or a combination thereof are added and, optionally, an acid, an alkali or a salt is added.

10. The process as claimed in claim 9, wherein C.I. Pigment Red 53:2 which is present wholly or partially in the α-modification is heated, together with chlorobenzene or a chlorobenzene/water mixture, to a temperature of from 60° C. to the boiling point of the solvent or solvent mixture at atmospheric pressure, and then cooled to a temperature of from −20 to +90° C., optionally water, a second solvent having low dissolving power or a combination thereof are added and, optionally, an acid, an alkali or a salt is added.

11. The process as claimed in claim 9, wherein the C.I. Pigment Red 53:2 which is present wholly or partly in the α-modification is used as a dry pigment, in the form of a water-moist press cake or as an aqueous suspension.

12. A process for the preparation of C.I. Pigment Red 53:2 of the formula (I)

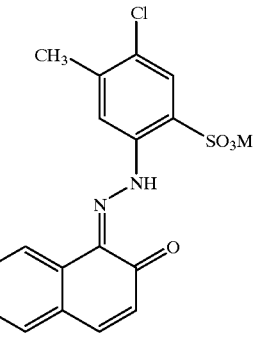

(I)

in which M is a cation, with the proviso that at least 50% of the cations are calcium ions, in the δ-modification, which has the following characteristic reflections in the X-ray powder diffraction pattern, measured using Cu—$K_\alpha$ radiation:

| δ: | 2Θ | d | Relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6 | wherein C.I. Pigment Red 53:2 which is present wholly or partly in the α-modification is kneaded or milled in the presence of chlorobenzene or a chlorobenzene/water mixture at a temperature of from 40 to 200° C.

13. A C.I. Pigment Red 53:2 mixture containing at least 10% of the δ-modification as claimed in claim 1.

14. The mixture as claimed in claim 13, containing at least 25% of the δ-modification.

15. The mixture as claimed in claim 13, containing at least 50% of the δ-modification.

16. The mixture as claimed in claim 13, containing at least 75% of the δ-modification.

17. A method of pigmenting coatings, plastics, printing inks, electrophotographic toners and developers, powder coatings, inkjet inks, aqueous pigment preparations and seeds comprising the step of adding a C.I. Pigment Red 53:2 of the formula (I)

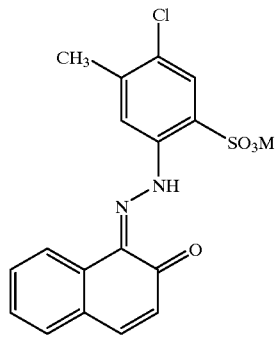

(I)

in which M is a cation, with the proviso that at least 50% of the cations are calcium ions, in the δ-modification, which has the following characteristic reflections in the X-ray powder diffraction pattern, measured using Cu—K$_\alpha$ radiation:

| δ: | 2Θ | d | Relative intensity (in %) |
|---|---|---|---|
| | 3.3 | 26.6 | 32 |
| | 4.7 | 18.7 | 100 |
| | 7.5 | 11.9 | 14 |
| | 9.4 | 9.3 | 19 |
| | 10.5 | 8.4 | 13 |
| | 13.8 | 6.4 | 10 |
| | 14.2 | 6.2 | 9 |
| | 14.9 | 5.9 | 10 |
| | 16.7 | 5.3 | 11 |
| | 17.6 | 5.0 | 9 |
| | 18.1 | 4.9 | 16 |
| | 18.9 | 4.7 | 10 |
| | 20.4 | 4.3 | 7 |
| | 21.1 | 4.2 | 9 |
| | 22.1 | 4.0 | 9 |
| | 22.7 | 3.9 | 12 |
| | 23.1 | 3.8 | 9 |
| | 23.6 | 3.8 | 13 |
| | 24.1 | 3.7 | 9 |
| | 24.9 | 3.6 | 10 |
| | 25.5 | 3.5 | 23 |
| | 26.3 | 3.4 | 9 |
| | 27.7 | 3.2 | 9 |
| | 28.1 | 3.2 | 6 |
| | 28.9 | 3.1 | 6 |
| | 30.4 | 2.9 | 6 | to a coating, plastic, printing ink liquor, electrophotographic toner and developer, powder coating, inkjet ink liquor, aqueous pigment preparation or seed to be pigmented.

* * * * *